T. E. MOORHOUSE.
CAMERA APPLICABLE TO AERIAL PHOTOGRAPHY.
APPLICATION FILED NOV. 4, 1919.
1,420,440. Patented June 20, 1922.
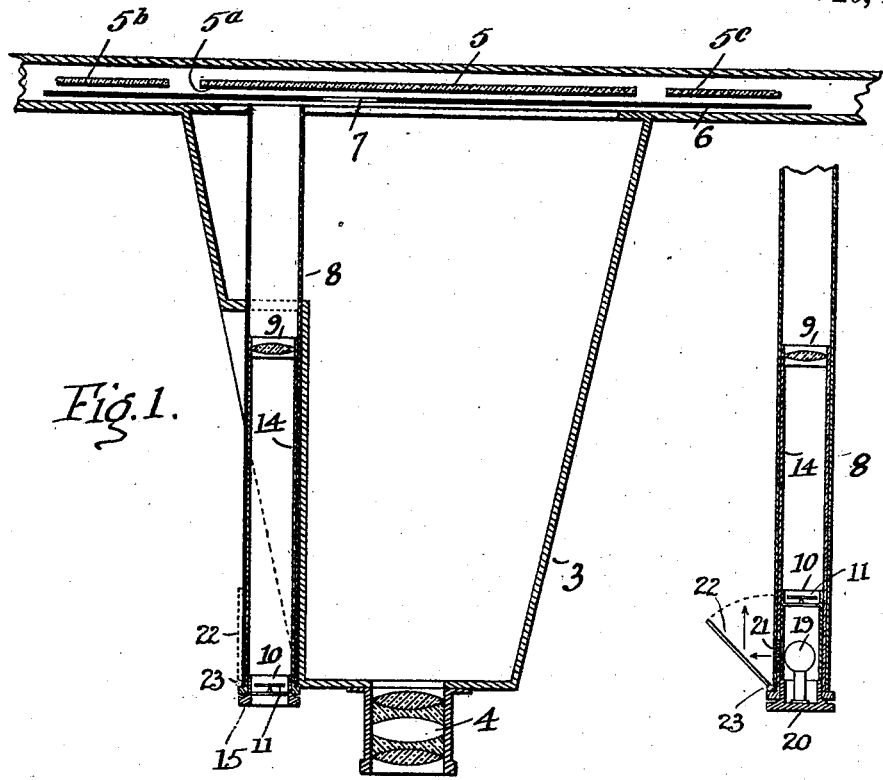
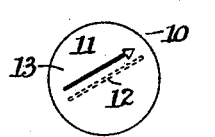 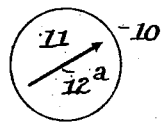 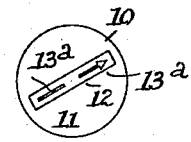
Fig.4. Fig.5. Fig.6.
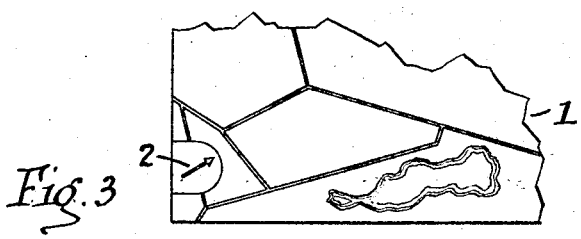
Fig.3.
INVENTOR:
Thomas Edward Moorhouse
BY Wm Wallace White
ATTY.

UNITED STATES PATENT OFFICE.

THOMAS EDWARD MOORHOUSE, OF HAWTHORN, VICTORIA, AUSTRALIA.

CAMERA APPLICABLE TO AERIAL PHOTOGRAPHY.

1,420,440.  Specification of Letters Patent.  Patented June 20, 1922.

Application filed November 4, 1919. Serial No. 335,708.

*To all whom it may concern:*

Be it known that I, THOMAS EDWARD MOORHOUSE, a subject of the King of Great Britain and Ireland, etc., residing at Hawthorn, in the State of Victoria, Commonwealth of Australia, have invented certain new and useful Improvements in and relating to Cameras Applicable to Aerial Photography; and I do hereby declare the following to be a full, clear, and exact description of the invention, such as will enable others skilled in the art to which it appertains to make and use the same.

My invention is applicable to cameras and attachments therefor, but principally to cameras used for aerial photography of land surfaces. One object of the invention is to produce negatives which overcome the difficulty and avoid the loss of time which has occurred in the effort to locate an indication of points of the compass on topographic photographs produced by aerial photography.

The present system of plotting the north and south line is superseded by the use of my invention which provides for easily making indications of such lines, and indications of other matter on the photographic plates or films. I attach to or include in a camera one or more indicating means, the position of which will not interfere with the taking of the usual photographs, but will cause geographic bearings or/and other predetermined matter to be indicated on the photographic plate or film, and in due course on the negative or print.

My attachment may have the mechanical arrangements herewith illustrated diagrammatically but is not limited thereto.

The indication to be made on the photographic plate or film, in the case illustrated is of a north and south line, and my means for securing that indication includes a compass or suitable part thereof.

In the drawings Figure 1 indicates a camera in section, having one form of my attachment.

Figure 2 shows my camera attachment separately with modifications.

Figure 3 shows portion of a developed plate, film, or print, bearing the indication required.

Figures 4 to 6 show various indicator members described later.

In these drawings 1 is part of a negative or print containing an indication 2, produced by my attachment, which is fitted to a camera, 3, having any suitable view lens 4. Any suitable photographic plate as 5 or the like is used having a sensitive film $5^a$. It is shown in a position to receive the ordinary exposure, its earlier and later positions being in some forms of magazine camera as shown at $5^b$ and $5^c$ respectively.

6 represents a blind or shutter of focal plane type for example, having an exposure opening 7.

A casing 8 shown as tubular is attached to the camera at any convenient part and is made of convenient size and form. This casing contains a suitable lens or lenses 9 and an indicator 10, details of which appear in Figures 4, 5, or 6.

The casing and its attachments form portions of a second camera but with its parts located to allow of its use in co-operation with the main camera. In Figures 4 to 6 part 10 is a disc or fitting its face 11 being adapted to act as a background or wall and it may be arranged as a compass dial. On this face 12 represents the compass needle; $12^a$ is a luminous faced compass needle; 13 is a slot pointing in a predetermined direction as north and south, and located to one side of the compass needle; and $13^a$ shows a plurality of slots pointing in a predetermined direction as north and south. The latter slots extend along the compass needle, and will allow light to pass through the background. The light is to pass through the slot or slots for indicating what is required on the photographic plate or film.

The light has somewhat the same result as is secured when stencilling except that it acts by focussing the indicator through the lens 9, but for brevity the said slotted members may be termed camera stencil plates. The lens 9 is shown in a tube 14 and is independent of the camera view lens 4.

The compass device and lens thereof are mounted in such positions that the indicator image to be produced becomes projected upon the sensitive plate or film when required that is when or very nearly when the exposure is made for the view to be photographed.

Tube 14 is removable from tube 8. A removable fitting marked 15 can be used with its outer end open to daylight, and it carries the compass indicator and is arranged as an attachment to tube 14.

I may have a plurality of indicator attachments on the same camera so located that the exposure effected in connection therewith shall be at or nearly at the same time.

In Figure 1 day light is supposed to be used, hence the background allows no light into the camera except where it passes through the slot as in Figure 4 or 6.

In modification of Figure 1 however if the background be that of Figure 5 the light is kept out completely but the needle $12^a$, or indicator is luminous.

When artificial light is used such as from a lamp 19 (Figure 2) the latter is suitably attached as to a fitting 20 of the tube 14 the outer part of the fitting closing this tube light tight. Fitting 20 is removable and replaceable at will.

Means are provided in any lamp carrying attachment for indication of the lamp action to an observer. Thus 21 is a ruby or like glass window and 22 a reflector to reflect the flash light to the operator. This reflector may be hinged at 23 to close against the window at will, and any suitable means may be provided for holding it in closed position. Indicators prepared in advance may be at hand and be inserted or removed at will according to the photographer's requirements.

For brevity the attachment to the main camera, may, when it contains a compass for the purpose described, be referred to as a direction indicating camera.

It will be understood that the needle of the compass can swing in the normal manner while in the latter camera; and similarly when a direction slot is used the compass card or element containing the slot is adapted to move so as to keep the direction of the slot true.

Having described this invention what is claimed by Letters Patent is:—

1. An apparatus for aerial photography, comprising, in combination, a main camera and an auxiliary camera provided with a direction-indicating element, each of said cameras having a lens disposed for focusing on a single sensitized element supported at the rear of the cameras and a shutter between said sensitized element and said lenses and movable for exposing said element to the action of said lenses whereby a topographic representation and a direction-indication applicable thereto are produced on said sensitized element.

2. A camera attachment, comprising a casing having a focussing lens, and a member carried by the casing in alinement with said lens, said member having a slot extending in a predetermined direction and adapted to permit the passage of light thereby to produce a direction-indication on a sensitized element supported within the casing.

3. A camera attachment, comprising a casing having a focussing lens, an indicator supported in said casing in alinement with said lens and adapted to permit the passage of light therethrough, and means carried by the casing for projecting light first through said indicator and then through the lens for producing a predetermined indication upon a sensitized element supported within the casing.

4. The combination with a camera having means for supporting and for exposing a sensitized element, of an attachment comprising a casing extending through the camera to a point immediately in front of said element, a removable tube within said casing and provided with a focussing lens independent of that of the camera, said tube being adapted to receive in the end thereof opposite from said element one of a series of interchangeable indicators.

5. The combination with a camera, of a plurality of interchangeable members each having a predetermined indication, means for removably supporting one of said members on said camera, and means for projecting on to a sensitized element carried by the camera the indication carried by said member in addition to the view projected thereupon by the camera.

In witness whereof I have hereunto set my hand.

THOMAS EDWARD MOORHOUSE.